US009011139B2

(12) United States Patent
Lawrence et al.

(10) Patent No.: US 9,011,139 B2
(45) Date of Patent: Apr. 21, 2015

(54) MOLD TOOL SYSTEM HAVING A NOZZLE POSITION ADJUSTMENT ASSEMBLY (75) Inventors: Thomas Andrew Lawrence, Burlington, VT (US); Troy Richard Mercer, Milton, VT (US); Douglas R. Leblanc, Fairfax, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/114,551

(22) PCT Filed: May 8, 2012

(86) PCT No.: PCT/US2012/036887
§ 371 (c)(1),
(2), (4) Date: Oct. 29, 2013

(87) PCT Pub. No.: WO2012/154716
PCT Pub. Date: Nov. 15, 2012

(65) Prior Publication Data
US 2014/0076982 A1    Mar. 20, 2014

Related U.S. Application Data (60) Provisional application No. 61/484,240, filed on May 10, 2011.

(51) Int. Cl.
B29C 45/22    (2006.01)
B05B 15/10    (2006.01)
B29C 45/27    (2006.01)
B29C 45/26    (2006.01)

(52) U.S. Cl.
CPC ............ *B05B 15/10* (2013.01); *B29C 45/2725* (2013.01); *B29C 45/2602* (2013.01); *B29C 45/27* (2013.01); *B29C 2045/2796* (2013.01)

(58) Field of Classification Search
CPC .................................................. B29C 45/2725
USPC .......................... 425/549, 563, 564, 566, 572
See application file for complete search history.

(56) References Cited

U.S. PATENT DOCUMENTS

| | | | |
|---|---|---|---|
| 2,857,788 A | 10/1958 | Huhn | |
| 3,718,166 A | 2/1973 | Gordon | |
| 5,049,062 A | 9/1991 | Gellert | |
| 5,833,899 A * | 11/1998 | Wunderlich | 425/572 |
| 7,059,847 B2 | 6/2006 | Takeda et al. | |
| 7,329,118 B2 | 2/2008 | Pruden et al. | |
| 7,465,166 B2 | 12/2008 | Manda | |
| 8,899,961 B2 * | 12/2014 | Esser et al. | 425/547 |
| 2011/0012277 A1 | 1/2011 | Lau et al. | |
| 2013/0323349 A1 * | 12/2013 | Plumpton | 425/572 |

OTHER PUBLICATIONS

International Search Report, 3 pages.

* cited by examiner

*Primary Examiner* — Tim Heitbrink (57) ABSTRACT

A mold-tool system (100), comprising: a nozzle position-adjustment assembly (104) being configured to selectively adjust position of a nozzle assembly (102) between: (i) a nozzle-loaded position, and (ii) a nozzle-unloaded position.

12 Claims, 8 Drawing Sheets

MOLD TOOL SYSTEM HAVING A NOZZLE POSITION ADJUSTMENT ASSEMBLY

TECHNICAL FIELD

An aspect generally relates to (but is not limited to) mold-tool systems, and/or molding system, etc.

BACKGROUND

U.S. Pat. No. 5,049,062 (GELLERT) discloses a multi-cavity injection molding system or apparatus having a spring and sealing housing mounted between each nozzle and the manifold. Each nozzle reciprocates between a retracted open position and a forward closed position in which the tapered forward end is seated in a gate. The nozzle has a central sleeve portion with a bore that projects rearwardly into a matching bore in the housing. Disc springs received in a channel in the housing that extends around the sleeve portion of the nozzle biases the nozzle to the closed position. During each cycle, injection pressure drives each nozzle to the retracted open position, and then the spring bias drives it to the forward closed position when the injection pressure is released. The spring and sealing housing avoids leakage and misalignment as the nozzle reciprocates.

U.S. Pat. No. 7,329,118 (PRUDEN, et al.) discloses an expansion nozzle for conducting melt from a floating manifold to a mold assembly. A bushing has a bushing flange and spigot has a passage therethrough joining a nozzle inlet and an outlet. A head has a seating surface and a bore through the head slidably receiving the spigot so that the spigot is movable relative to the head over a range from abutting contact of opposing surfaces of the head and bushing flange to a limit of axial separation of the opposing surfaces. Axial separation of opposing surfaces of the head and bushing flange are maintained throughout an operating temperature range. Springs maintain sealing contact of a seating surface of the head with a mating surface of the mold assembly. Advantageously, a locating ring provides a reaction surface for the springs and supports the head to resist moments arising from axial misalignment of the expansion nozzle and mold assembly.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

For some runner systems, nozzle tips may be retained in a mold-cavity insert of a mold assembly. A nozzle assembly slides past the nozzle tips during assembly of the runner system with the mold assembly. The nozzle assembly must be able to rotate freely as the nozzle assembly first engages the nozzle tips, so that the nozzle assembly becomes correctly oriented with respect to the nozzle tips and the mold cavities. If the nozzle assembly cannot rotate freely, the nozzle tips may be damaged, and the runner system may (undesirably) leak plastic (that is, resin) during normal operation of a molding system. When a manifold plate and a backing plate are bolted together on the runner system, the nozzle assembly does not freely rotate due to a load applied to the nozzle assembly by a nozzle spring. The nozzle spring load is applied to the nozzle assembly to ensure a seal-off condition between the nozzle assembly and a manifold assembly of the runner system. The manifold plate and the backing plate are bolted together before the runner assembly is connected with the mold assembly. The manifold plate and the backing plate must remain partially separated during connection with the mold assembly so that the nozzle spring remains unloaded and the nozzle assembly can rotate freely.

According to a first aspect of a solution to the above-identified problem, there is provided a mold-tool system (100), comprising: a nozzle position-adjustment assembly (104) being configured to selectively adjust position of a nozzle assembly (102) between: (i) a nozzle-loaded position, and (ii) a nozzle-unloaded position.

Other aspects of the solution to the above-identified problem are provided by the independent claims of the claims. Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIGS. 1A, 1B, 1C, 2, 3, 4A, 4B, 4C depict schematic representations of a mold-tool system (100). It will be appreciated that the examples depicted and/or described may be combined in any suitable permutation and combination. The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising." The word "comprising" is a transitional phrase or word that links the preamble of a patent claim to the specific elements set forth in the claim that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

The definition of the mold-tool system (100) is as follows: a system that may be positioned and/or may be used in an envelope defined by the stationary platen (906) and the movable platen (908) of the molding system (200).

Figure 1A:
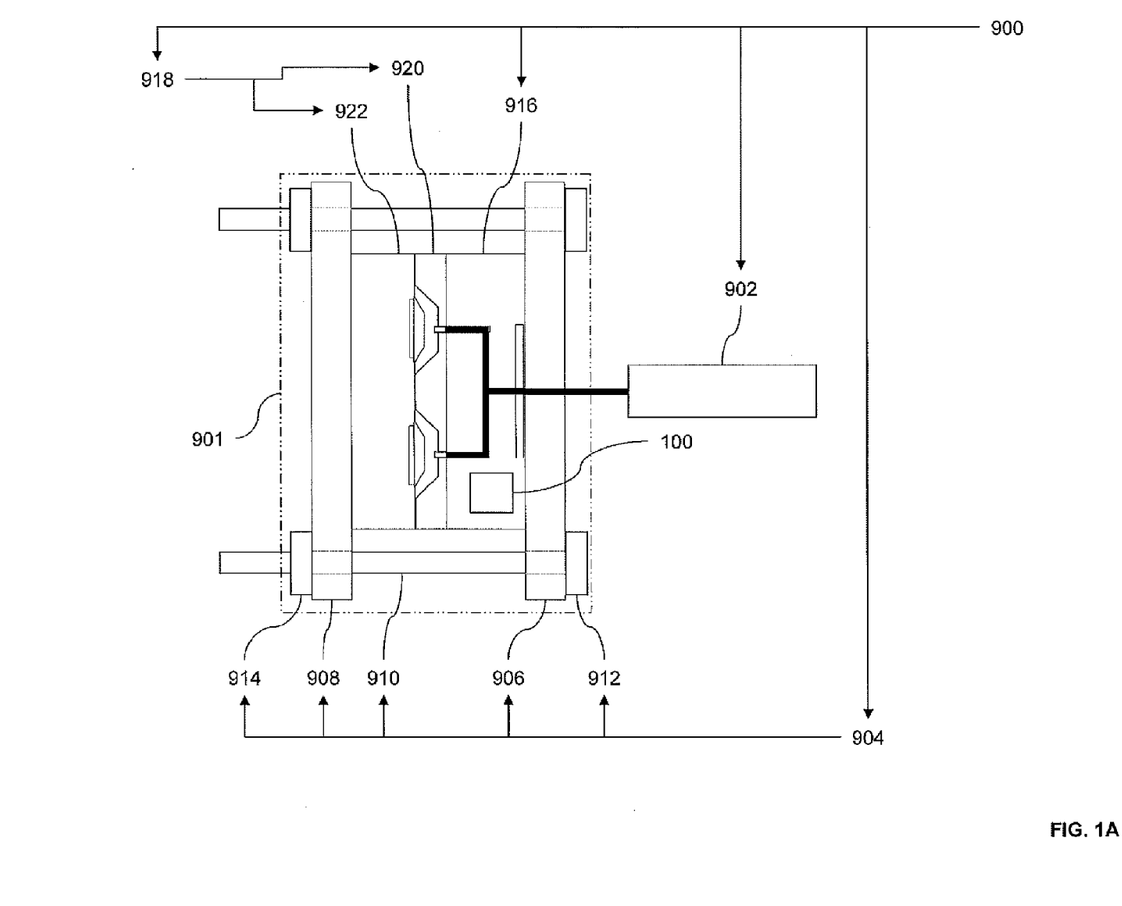
FIGS. 1A, 1B, 1C, 2, 3, 4A, 4B, 4C depict schematic representations of a mold-tool system (100).
Figure 1B:
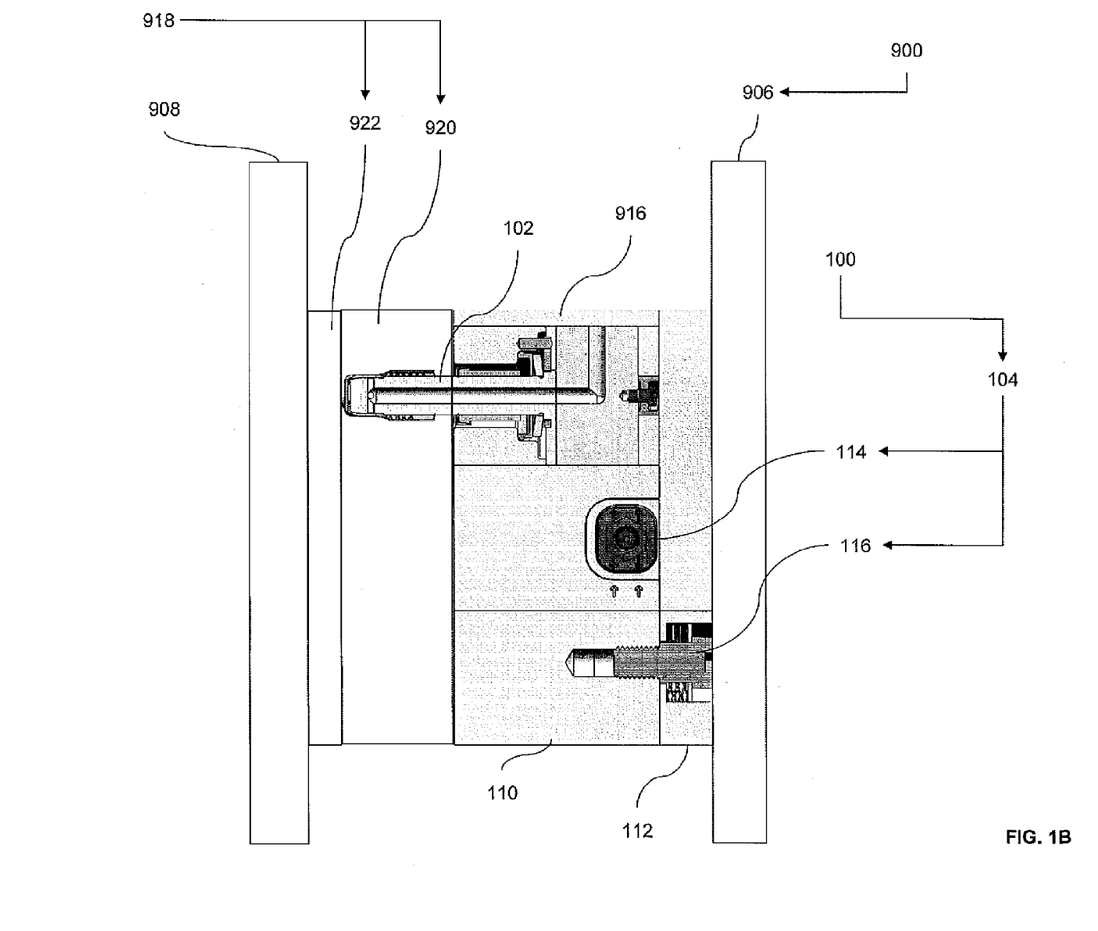
Figure 1C:
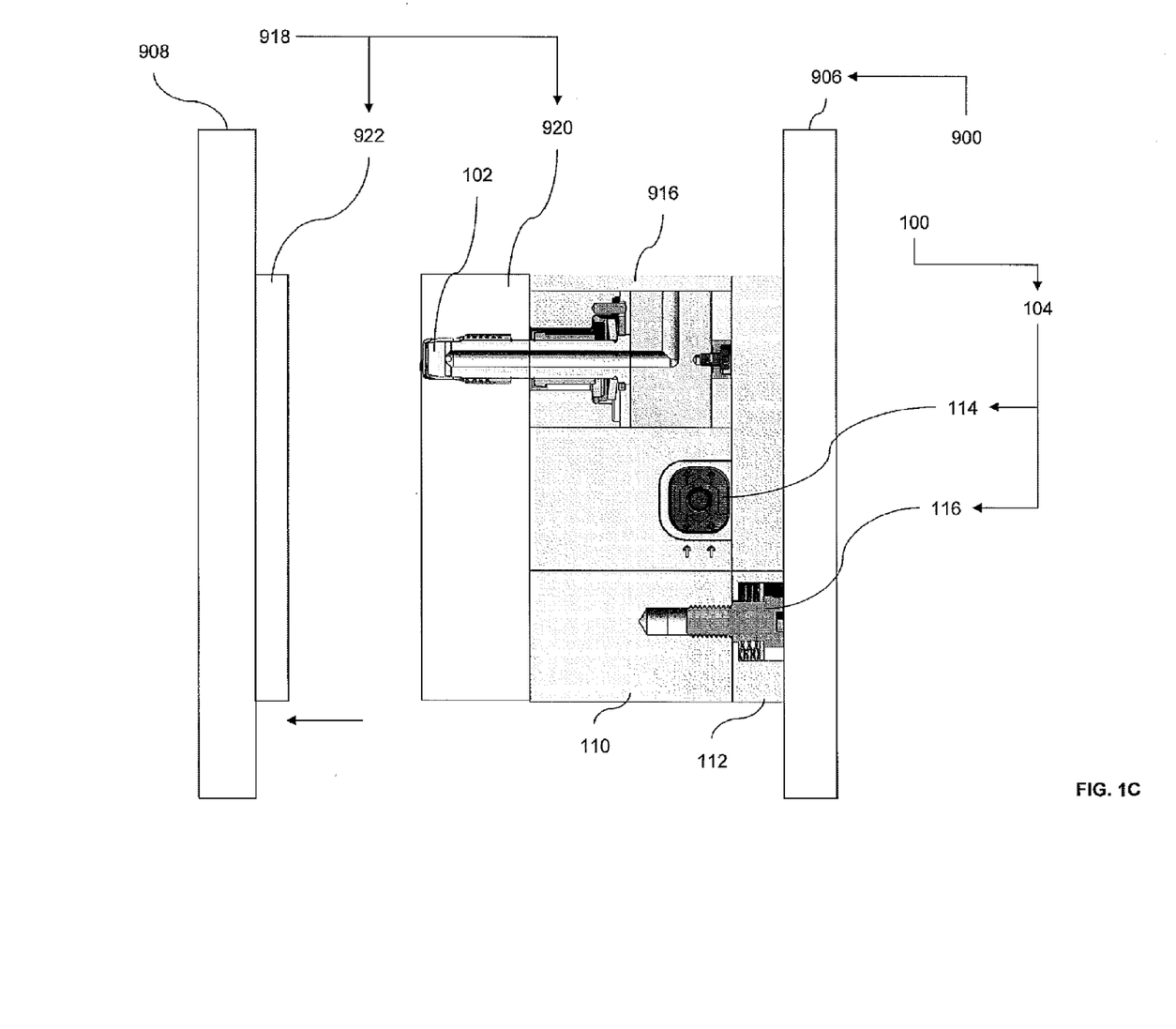

FIGS. 1A, 1B, 1C depict schematic representations of a molding system (900) that has the mold-tool system (100). The molding system (900) may also be called an injection-molding system, for example. According to the example depicted in FIG. 1, the molding system (900) includes (and is not limited to): (i) an extruder assembly (902), (ii) a clamp assembly (904), (iii) a runner assembly (916), and (iv) a mold assembly (918). By way of example, the extruder assembly (902) is configured, to prepare, in use, a heated, flowable resin, and is also configured to inject or to move the resin from the extruder assembly (902) toward the runner assembly (916). Other names for the extruder assembly (902) may include injection unit, melt-preparation assembly, etc. By way of example, the clamp assembly (904) includes (and is not limited to): (i) a stationary platen (906), (ii) a movable platen (908), (iii) a rod assembly (910), (iv) a clamping assembly (912), and (v) a lock assembly (914). The stationary platen (906) does not move. The stationary platen (906) may be fixedly positioned relative to the ground or floor. The movable platen (908) is configured to be movable relative to the stationary platen (906). A platen-moving mechanism (not depicted but known) is connected to the movable platen (908); the platen-moving mechanism is configured to move, in use, the movable platen (908). The rod assembly (910) extends between the movable platen (908) and the stationary platen (906). The rod assembly (910) is configured to guide movement of the movable platen (908) relative to the stationary platen (906). A clamping assembly (912) is connected to the rod assembly (910). The stationary platen (906) supports the clamping assembly (912). The lock assembly (914) is connected to the rod assembly (910). The movable platen (908) supports the lock assembly (914). By way of example, the runner assembly (916) is attached to or supported by the stationary platen (906). The runner assembly (916) includes (and is not limited to) a mold-tool system (100). The definition of the mold-tool system (100) is as follows: a system that may be positioned and/or may be used in a platen envelope (901) defined by, in part, an outer perimeter of the stationary platen (906) and the movable platen (908) of the molding system (900) (as depicted in FIG. 1). The molding system (900) may include (and is not limited to) the mold-tool system (100). The runner assembly (916) is configured to receive the resin from the extruder assembly (902). By way of example, the mold assembly (918) includes (and is not limited to): (i) a stationary-mold assembly (920), and (ii) a movable-mold assembly (922) that is movable relative to the stationary-mold assembly (920). The movable-mold assembly (922) is attached to or supported by the movable platen (908). The stationary-mold assembly (920) is attached to or supported by the runner assembly (916), so that the movable-mold assembly (922) faces the stationary-mold assembly (920). The runner assembly (916) is configured to distribute the resin from the extruder assembly (902) to the mold assembly (918).

In operation, the movable platen (908) is moved toward the stationary platen (906) so that the stationary-mold assembly (920) is closed against the movable-mold assembly (922), so that the mold assembly (918) may define a mold cavity structure that is configured to receive the resin from the runner assembly (916). The lock assembly (914) is engaged so as to lock the position of the movable platen (908) so that the movable platen (908) no longer moves relative to the stationary platen (906). The clamping assembly (912) is then engaged to apply a clamping pressure, in use, to the rod assembly (910), so that the clamping pressure then may be transferred to the mold assembly (918). The extruder assembly (902) pushes or injects, in use, the resin to the runner assembly (916), which then the runner assembly (916) distributes the resin to the mold cavity structure defined by the mold assembly (918). Once the resin in the mold assembly (918) is solidified, the clamping assembly (912) is deactivated so as to remove the clamping force from the mold assembly (918), and then the lock assembly (914) is deactivated to permit movement of the movable platen (908) away from the stationary platen (906), and then a molded article may be removed from the mold assembly (918).

It will be appreciated that: (i) all of the above components, assemblies, etc, may: (i) all be sold separately or provided by a combination of multiple vendors, (ii) some vendors may provide a combination of a limited selection of the above components, assemblies, etc, or, (iii) a single vendor may provide all of the above of the above components, assemblies, etc.

With reference to FIGS. 1A, 1B, 1C, generally speaking, a first example of the mold-tool system (100) includes (and is not limited to): a nozzle position-adjustment assembly (104). The nozzle position-adjustment assembly (104) is configured to selectively adjust position of a nozzle assembly (102) between: (i) a first nozzle position, and (ii) a second nozzle position. By way of examples (and not limited to these examples): (i) the first nozzle position (depicted in FIG. 4A), and (ii) the second nozzle position (depicted in FIG. 4C). Generally speaking, a second example of the mold-tool system (100) includes (and is not limited to): (i) the nozzle assembly (102), and (ii) the nozzle position-adjustment assembly (104) configured to selectively adjust position of the nozzle assembly (102) between: (i) the first nozzle position, and (ii) the second nozzle position. The nozzle assembly (102) is positioned relative to the nozzle position-adjustment assembly (104). Generally speaking, in accordance with an option, the molding system (900) has the mold-tool system (100). Generally speaking, in accordance with another option, the runner assembly (916) has the mold-tool system (100). Generally speaking, in accordance with another option, the nozzle assembly (102) includes (and is not limited to): the nozzle position-adjustment assembly (104). It will be appreciated that the mold-tool system (100) is operated in accordance with a method including (and not limited to): selectively adjusting position of the nozzle assembly (102) between: (i) the first nozzle position, and (ii) the second nozzle position.

With reference to FIGS. 1B and 1C, an example of the nozzle position-adjustment assembly (104) is depicted, in which the nozzle position-adjustment assembly (104) includes (and is not limited to): a plate-biasing mechanism (116). The plate-biasing mechanism (116) is configured to bias position of the manifold plate (110) and the backing plate (112) together. It will be appreciated that the FIG. 3 depicts an example of a specific implementation of the plate-biasing mechanism (116), and that the plate-biasing mechanism (116) is not limited to the specific example depicted in FIG. 3. In addition, the nozzle position-adjustment assembly (104) further includes (and is not limited to): a plate-moving mechanism (114). The plate-moving mechanism (114) is configured to move a manifold plate (110) and a backing plate (112) relative to each other between: (i) the nozzle-loaded position, and (ii) the nozzle-unloaded position. It will be appreciated that the FIG. 2 depicts an example of a specific implementation of the plate-moving mechanism (114), and that the plate-moving mechanism (114) is not limited to the specific example depicted in FIG. 2.

Figure 2:
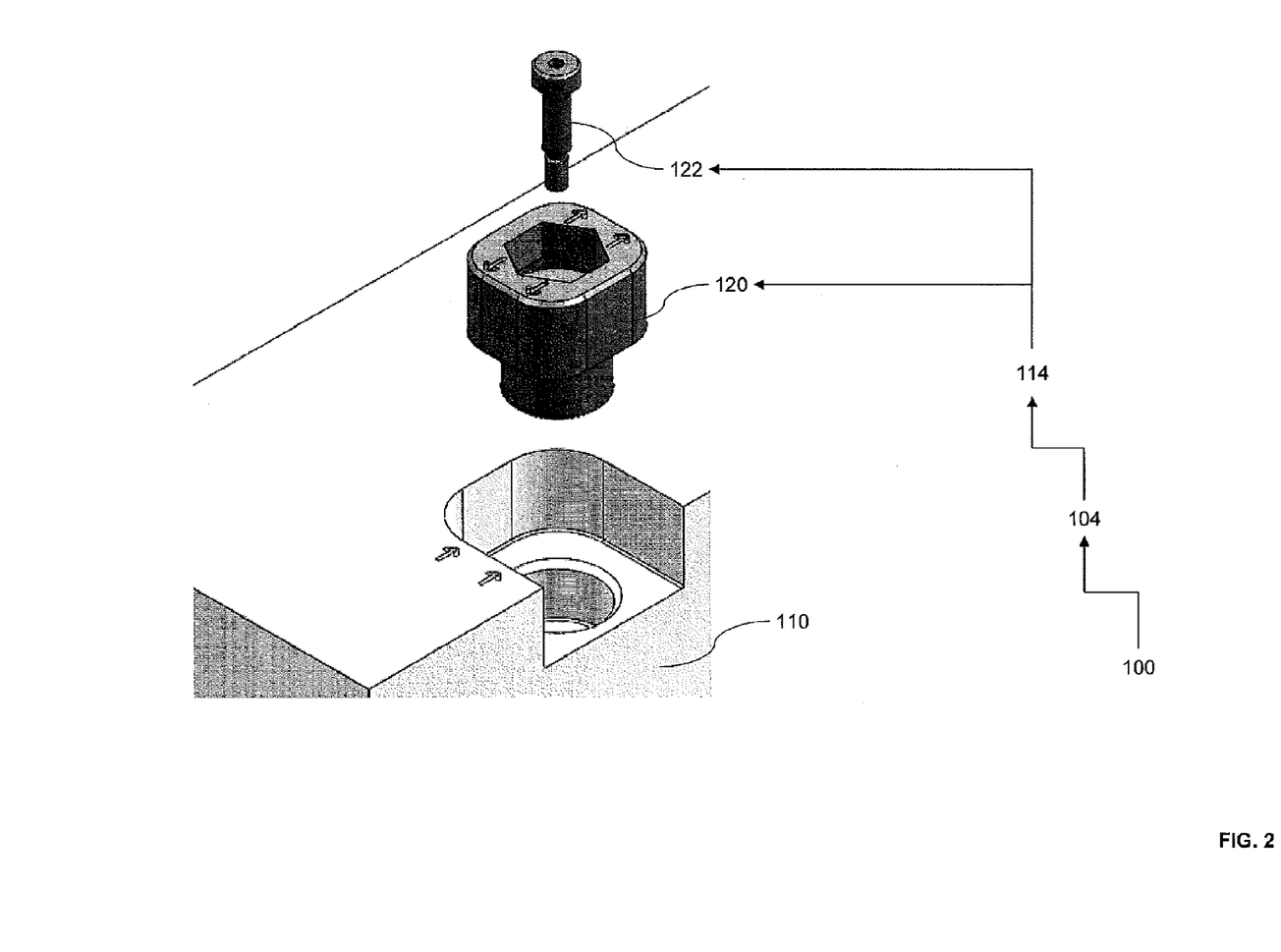
Figure 3:
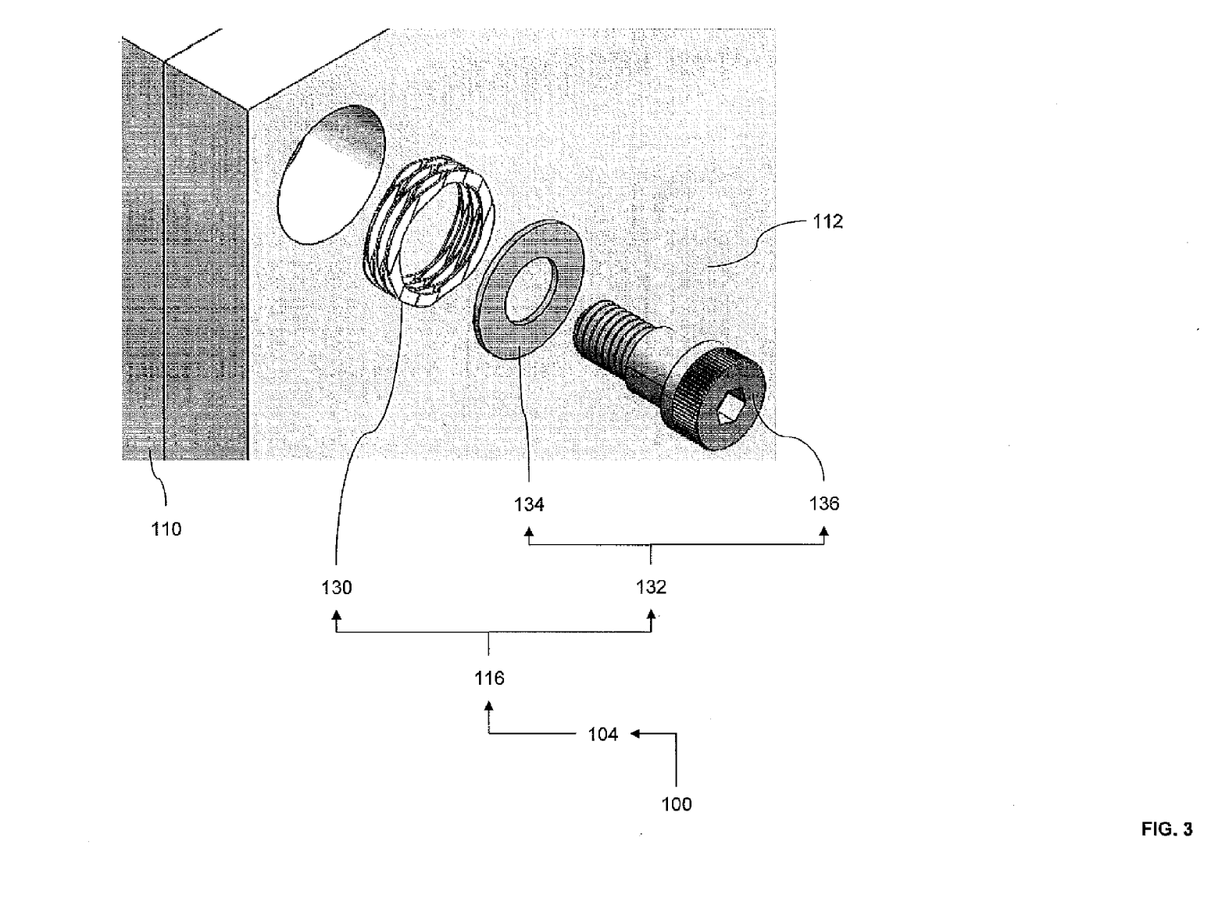

With reference to the example depicted in FIG. 2, the plate-moving mechanism (114) includes (and is not limited to): (i) a cam-jack assembly (120), and (ii) a manifold-mounting assembly (122). The manifold-mounting assembly (122) is configured to: (i) operatively rotatably mount the cam-jack assembly (120) relative to the manifold plate (110) and the backing plate (112), and (ii) permit rotation of the cam-jack assembly (120), the cam-jack assembly (120) selectively moving the manifold plate (110) and the backing plate (112) relative to each other. As depicted, the cam-jack assembly (120) is mounted on a side of the manifold plate (110). It will be appreciated, in accordance with an option (that is not depicted but understood in view of the example depicted in FIG. 2), the cam-jack assembly (120) may be mounted to the backing plate (112). Specifically, the cam-jack assembly (120) includes a shaft, and is inserted into a bore formed in a side of the manifold plate (110). The cam-jack assembly (120) includes (and is not limited to): a tool head that has an oblong rectangular shape with rounded corners. The cam-jack assembly (120) is loosely retained by the manifold-mounting assembly (122). The manifold-mounting assembly (122) may include (by way of example and not limited to) a shoulder screw. The cam-jack assembly (120) is free to rotate in the bore formed in the manifold plate (110) once so mounted to the manifold plate (110). In accordance with an option, the head of the cam-jack assembly (120) has an internal hex shaped feature configure to receive a tool, so that the cam-jack assembly (120) may be rotated with the aid of the tool (such as a wrench) if so desired. It will be appreciated that an actuator (not depicted) may be connected to the cam-jack assembly (120) if so desired as an alternative to the internal hex shaped feature configure to receive the tool. It will be appreciated that other variations are possible for the above description of the plate-moving mechanism (114).

With reference to the example depicted in FIG. 3, the plate-biasing mechanism (116) includes (and is not limited to): (i) a manifold-spring assembly (130), and (ii) a plate-mounting assembly (132). The plate-mounting assembly (132) is configured to operatively mount the manifold-spring assembly (130) so as to bias the manifold plate (110) toward the backing plate (112). The plate-mounting assembly (132) may include (and is not limited to): a shimming washer (134), and a connector (136). The connector (136) may have a shoulder screw with a socket head (other equivalent options may be used). The manifold-spring assembly (130) may include (and is not limited to): a wave-spring structure or wave spring (by way of example). The plate-biasing mechanism (116) includes (and is not limited to) a shoulder screw that attaches the backing plate (112) to the manifold plate (110). The manifold-spring assembly (130) is retained under a head of the shoulder screw (that is, the connector (136). The manifold-spring assembly (130) sits in a bore defined or formed in the backing plate (112). The manifold-spring assembly (130) is loaded between a bottom of the bore and the head of the shoulder screw—that is, the connector (136). The shoulder screw passes through the backing plate (112) so that a shoulder of the shoulder screw abuts a surface of the manifold plate (110). According to an option, the inner diameter of the manifold-spring assembly (130) is larger than the outer diameter of the head of the shoulder screw, so a shimming washer (134) is placed above the manifold-spring assembly (130) in order for the manifold-spring assembly (130) to be retained by the shoulder screw. It will be appreciated that other variations are possible for the above description of the plate-biasing mechanism (116).

Figure 4A:
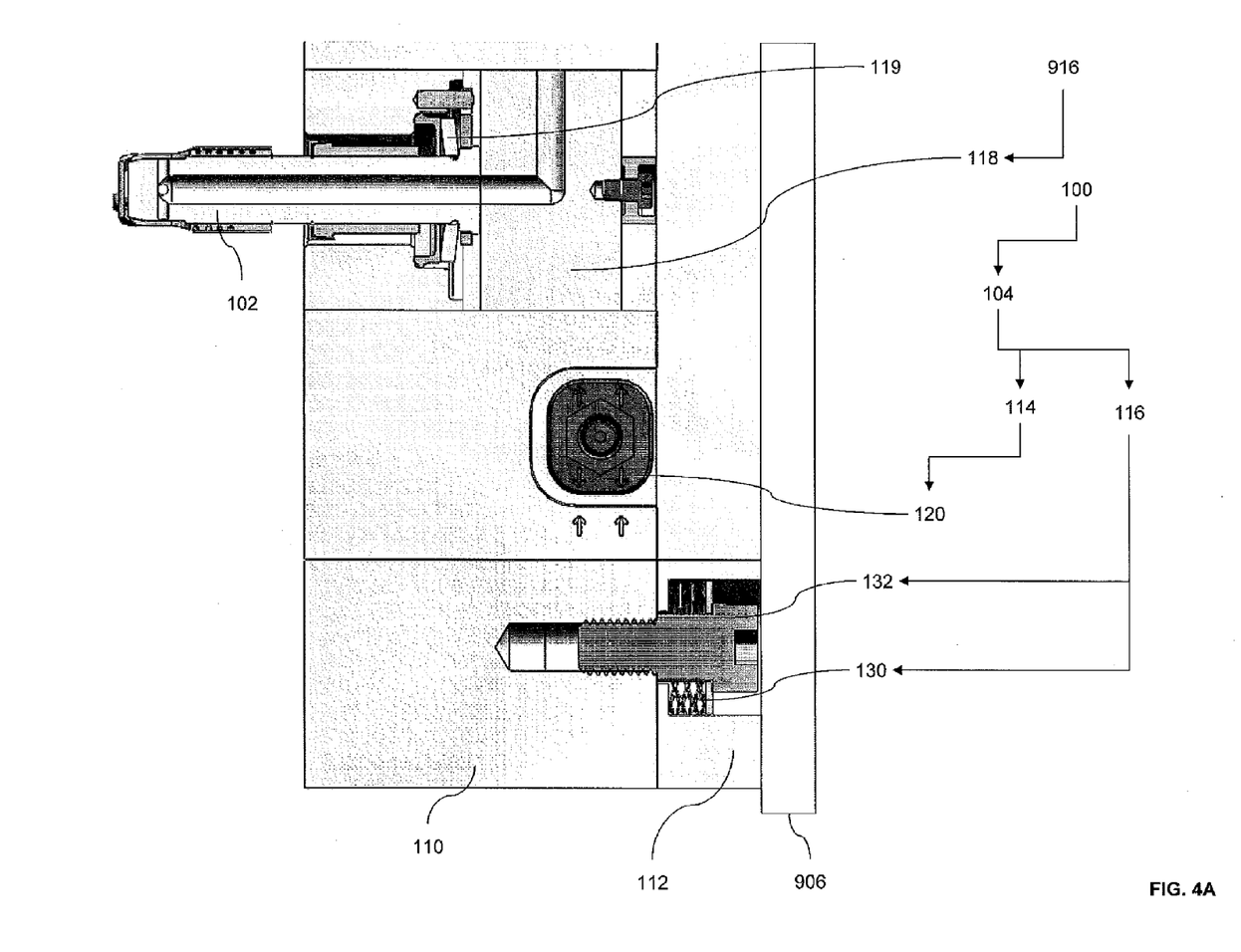
Figure 4B:
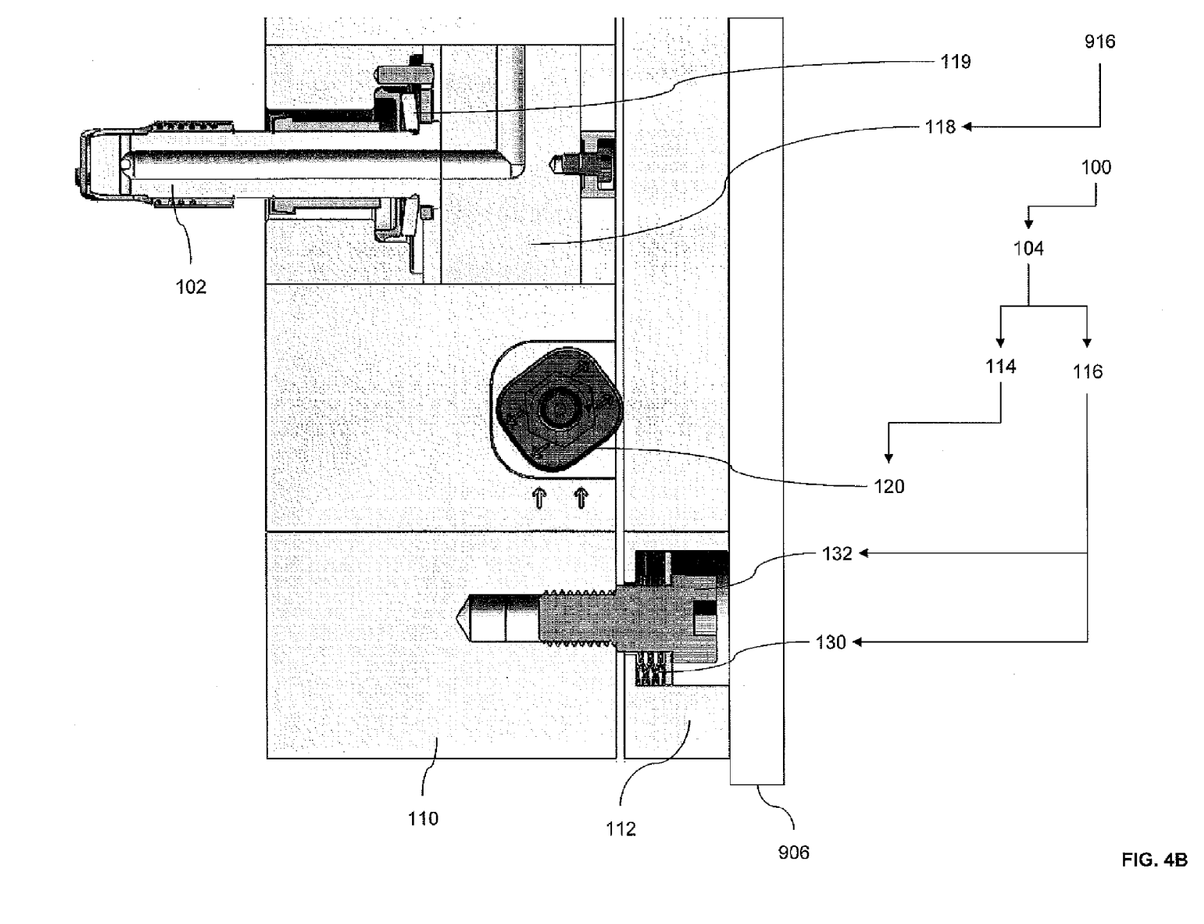
Figure 4C:
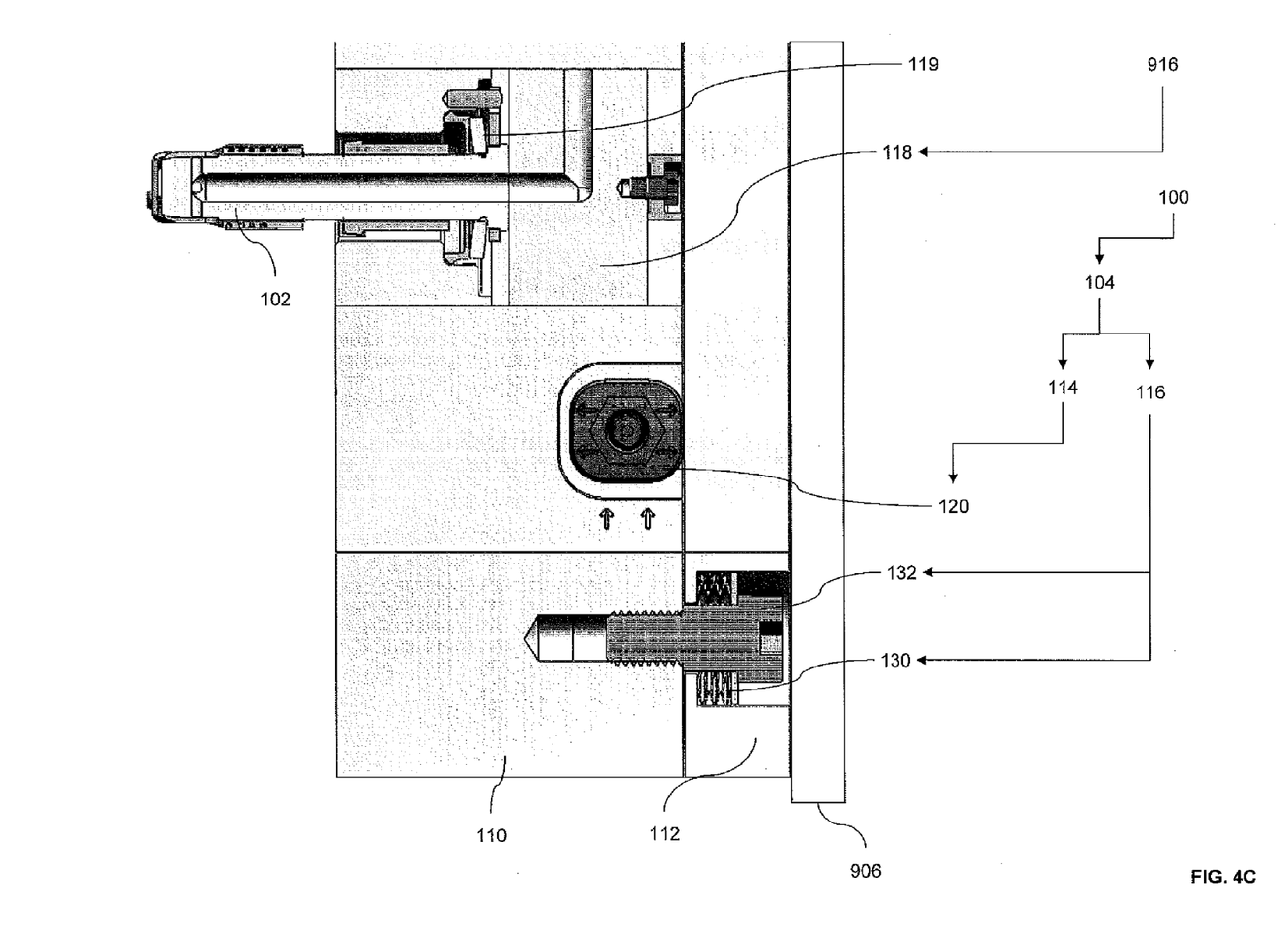

Referring generally now to FIGS. 4A, 4B, 4C, in accordance with the example depicted, the manifold plate (110) is included in a runner assembly (916). The manifold plate (110) is configured to accommodate supportive positioning of the nozzle assembly (102). The nozzle assembly (102) is normally biased toward the nozzle-loaded position (as depicted in FIG. 4A). The backing plate (112) is included in the runner assembly (916). The backing plate (112) is positioned relative to the manifold plate (110). The backing plate (112) faces the manifold plate (110).

With reference to FIG. 4A, there is depicted example (and not limited thereto) of a case where the plate-moving mechanism (114) is not actuated, and the plate-biasing mechanism (116) biases, in use, the backing plate (112) against the manifold plate (110). The first nozzle position includes a nozzle-loaded position, which is depicted in FIG. 4A. The nozzle-loaded position is a position in which the nozzle assembly (102) receives a load or receives a force. In the nozzle-loaded position, the nozzle assembly (102) is positioned in a fixed position. The fixed position is a position in which the nozzle assembly (102) is stationary and does not move. The runner assembly (916) includes (and is not limited to): a melt-distribution assembly (118), which may be also called a manifold assembly. A nozzle spring (119) is positioned in the runner assembly (916) so as to bias the nozzle assembly (102) in the fixed position. As depicted in FIG. 4A, (i) the nozzle position-adjustment assembly (104) is in a closed position, (ii) the nozzle spring (119) is loaded, (iii) the nozzle assembly (102) is not free to rotate, and (iv) a separation between the backing plate (112) and the manifold plate (110) is depicted as being zero millimeters (0 mm). The nozzle assembly (102) is spring biased toward the nozzle-loaded position. The nozzle position-adjustment assembly (104) is configured to selectively adjust spring biasing of the nozzle assembly (102), so that the nozzle assembly (102) is selectively adjustably positionable between: (i) the nozzle-loaded position, and (ii) the nozzle-unloaded position.

With reference to FIG. 4B, by way of example (and not limited thereto), the nozzle position-adjustment assembly (104) is rotated so that a separation between the backing plate (112) and the manifold plate (110) is realized. By way of example, the separation may be a maximum separation of 2.2 millimeters (mm). The nozzle position-adjustment assembly (104) is positioned in an intermediate position.

With reference to FIG. 4C, by way of example (and not limited thereto), the second nozzle position includes a nozzle-unloaded position as depicted in FIG. 4C. The nozzle-unloaded position is a position in which the nozzle assembly (102) is not receiving the load or not receiving the force. In the nozzle-unloaded position, the nozzle assembly (102) is removable from the fixed position. In the nozzle-unloaded position, the nozzle assembly (102) is rotatable. FIG. 4C depicts, by way of example, a case where the plate-moving mechanism (114) is actuated. The plate-moving mechanism (114) is configured to overcome, in use, the plate-biasing mechanism (116) so that the manifold plate (110) and the backing plate (112) are moved away from each other. The nozzle assembly (102) is selectively positioned or selectively moved from the nozzle-loaded position to the nozzle-unloaded position. The nozzle spring (119) is depicted in an unloaded condition or position. The nozzle assembly (102) is now in a rotatable condition. The nozzle position-adjustment assembly (104) is placed in an open position. The manifold-spring assembly (130) returns the manifold plate (110) relative to the backing plate (112) so that a separation gap exists between the manifold plate (110) and the backing plate (112). An example of the separation gap is 0.5 millimeter (mm) separation exists between the backing plate (112) and the manifold plate (110). The plate-moving mechanism (114) is placed in the open position. The nozzle assembly (102) is free to rotate. The runner assembly (916) is ready for assembly with the mold assembly (918).

In view of the above description, the following more detailed description will be appreciated: the mold-tool system (100) is configured to allow the manifold plate (110) to be separated from the backing plate (112) in a controlled manner to relieve the spring load applied, by the nozzle spring (119), on the nozzle assembly (102). The nozzle assembly (102) may then freely rotate as the runner assembly (916) is assembled with the mold assembly (918). The mold-tool system (100) permits the backing plate (112) and manifold plate (110) to remain coupled so that the backing plate (112) and manifold plate (110) do not fall away from each other, thus preventing damage while maintaining the safety of the operator. The mold-tool system (100) helps to maintain a predetermined separation distance between the backing plate (112) and the manifold plate (110) during assembly of the runner assembly (916) with the mold assembly (918). The mold-tool system (100) permits separation between the manifold plate (110) and the backing plate (112) to be closed in a controlled manner after assembly of the runner assembly (916) with the mold assembly (918). The backing plate (112) and manifold plate (110) may then be bolted together securely for normal operation of the runner assembly (916).

A more detailed description of the operation is provided as follows: referring now to FIG. 4A, the plate-moving mechanism (114), for which the cam-jack assembly (120) is a specific example thereof, is in the closed position. Separation between the manifold plate (110) and the backing plate (112) is (by way of example) zero millimeters. The nozzle spring (119) is loaded and the nozzle assembly (102) is not free to rotate. The cam-jack assembly (120) is oriented with its longer side parallel to a parting line between the manifold plate (110) and the backing plate (112). In this position, the cam-jack assembly (120) is not in contact with the backing plate (112). The nozzle assembly (102) is loaded between the nozzle spring (119) and the melt-distribution assembly (118), which in turn is loaded by the backing plate (112). The nozzle assembly (102) cannot freely rotate due to this load. Referring now to FIG. 4B, the plate-moving mechanism (114) is rotated, and the maximum plate separation is (by way of example) 2.2 millimeters. The non-spring-loaded bolts (not depicted) that attach the backing plate (112) to the manifold plate (110) have been removed. The cam-jack assembly (120) is rotated, and as the rounded corner of the head of the cam-jack assembly (120) contacts the backing plate (112), the backing plate (112) becomes to separated from the manifold plate (110). By way of example, the maximum separation between the manifold plate (110) and the backing plate (112) may be 2.2 millimeter (mm). Referring now to FIG. 4C, the plate-moving mechanism (114) is in open position. The manifold-spring assembly (130) returns the manifold plate (110) and the backing plate (112) together so as to maintain a gap separation between them (such as a 0.5 millimeter gap for example). The nozzle assembly (102) is free to rotate and runner assembly (916) is ready for assembly with mold assembly (918). The cam-jack assembly (120) has been rotated to the closed position, which is a 90° rotation from the open position. The manifold-spring assembly (130) exerts a load against the head of the large shoulder screw—that is, the connector (136)—and the bottom of the bore in the backing plate (112). This load pushes the backing plate (112) toward the manifold plate (110). The longer side of the cam-jack assembly (120) is perpendicular to the parting line between the manifold plate (110) and backing plate (112). The cam-jack assembly (120) is in stable contact with the backing plate (112), so the gap between the manifold plate (110) and the backing plate (112) may be fixed at a predetermined distance (such as 0.5 mm for the depicted example). The load on the nozzle spring (119) has been relieved, so the nozzle assembly (102) is free to rotate. The runner assembly (916) may now be assembled with the mold assembly (918) without risk of damage to the nozzle assembly (102). After the runner assembly (916) has been assembled with the mold assembly (918), the cam-jack assembly (120) may be returned back to the closed position. The load exerted by the manifold-spring assembly (130) pushes the manifold plate (110) and the backing plate (112) together again and closes any gap between the manifold plate (110) and the backing plate (112). The manifold plate (110) and the backing plate (112) are now securely bolted together for normal operation of the runner assembly (916).

In summary, the cam-jack assembly (120) is rotatable, and separates, in use, the backing plate (112) from the manifold plate (110). The manifold-spring assembly (130) returns the manifold plate (110) and the backing plate (112) back to a predetermined gap between the plates when the cam-jack assembly (120) has been rotated to the open position. The manifold-spring assembly (130) returns the backing plate (112) to a position with no gap between the backing plate (112) and the manifold plate (110) when the cam-jack assembly (120) has been rotated to the closed position.

Additional Description

The following clauses are offered as further description of the examples: Clause (1): a mold-tool system (100), comprising: a nozzle position-adjustment assembly (104) being configured to selectively adjust position of a nozzle assembly (102) between: (i) a first nozzle position, and (ii) a second nozzle position. Clause (2): a mold-tool system (100), comprising: a nozzle assembly (102); and a nozzle position-adjustment assembly (104) being configured to selectively adjust position of the nozzle assembly (102) between: (i) a first nozzle position, and (ii) a second nozzle position. Clause (3): a mold-tool system (100), comprising: a nozzle assembly (102); and a nozzle position-adjustment assembly (104), the nozzle assembly (102) being positioned relative to the nozzle position-adjustment assembly (104), the nozzle position-adjustment assembly (104) being configured to selectively adjust position of the nozzle assembly (102) between: (i) a first nozzle position, and (ii) a second nozzle position. Clause (4): the mold-tool system (100) of any clause mentioned in this paragraph, wherein: the first nozzle position includes a nozzle-loaded position, and the second nozzle position includes a nozzle-unloaded position. Clause (5): the mold-tool system (100) of any clause mentioned in this paragraph, wherein: in the nozzle-loaded position, the nozzle assembly (102) is positioned in a fixed position, and in the nozzle-unloaded position, the nozzle assembly (102) is removable from the fixed position. Clause (6): the mold-tool system (100) of any clause mentioned in this paragraph, wherein: in the nozzle-loaded position, the nozzle assembly (102) is non-rotatable, and in the nozzle-unloaded position, the nozzle assembly (102) is rotatable. Clause (7): the mold-tool system (100) of any clause mentioned in this paragraph, wherein: the nozzle assembly (102) is spring biased toward the nozzle-loaded position; and the nozzle position-adjustment assembly (104) is configured to selectively adjust spring biasing of the nozzle assembly (102), so that the nozzle assembly (102) is selectively adjustably positionable between: (i) the nozzle-loaded position, and (ii) the nozzle-unloaded position. Clause (8): the mold-tool system (100) of any clause mentioned in this paragraph, wherein: the nozzle position-adjustment assembly (104) includes: a plate-moving mechanism (114) configured to move a manifold plate (110) and a backing plate (112) relative to each other between: (i) the nozzle-loaded position, and (ii) the nozzle-unloaded position, the manifold plate (110) is included in a runner assembly (916), the manifold plate (110) is configured to accommodate supportive positioning of the nozzle assembly (102), the nozzle assembly (102) is normally biased toward the nozzle-loaded position, and the backing plate (112) is included in the runner assembly (916), the backing plate (112) is positioned relative to the manifold plate (110), and the backing plate (112) faces the manifold plate (110). Clause (9): the mold-tool system (100) of any clause mentioned in this paragraph, wherein: the nozzle position-adjustment assembly (104) includes: a plate-moving mechanism (114) configured to move a manifold plate (110) and a backing plate (112) relative to each other between: (i) the nozzle-loaded position, and (ii) the nozzle-unloaded position. Clause (10): the mold-tool system (100) of any clause mentioned in this paragraph, wherein: the nozzle position-adjustment assembly (104) further includes: a plate-biasing mechanism (116) configured to bias position of the manifold plate (110) and the backing plate (112) together. Clause (11): the mold-tool system (100) of any clause mentioned in this paragraph, wherein: for the case where the plate-moving mechanism (114) is actuated, the plate-moving mechanism (114) is configured to overcome, in use, the plate-biasing mechanism (116) so that the manifold plate (110) and the backing plate (112) are moved away from each other, and the nozzle assembly (102) is selectively moved from the nozzle-loaded position to the nozzle-unloaded position; and for the case where the plate-moving mechanism (114) is not actuated, the plate-biasing mechanism (116) biases, in use, the backing plate (112) against the manifold plate (110). Clause (12): the mold-tool system (100) of any clause mentioned in this paragraph, wherein: the plate-moving mechanism (114) includes: a cam-jack assembly (120); and a manifold-mounting assembly (122) configured to: (i) operatively rotatably mount the cam-jack assembly (120) relative to the manifold plate (110) and the backing plate (112), and (ii) permit rotation of the cam-jack assembly (120), the cam-jack assembly (120) selectively moving the manifold plate (110) and the backing plate (112) relative to each other. Clause (13): the mold-tool system (100) of any clause mentioned in this paragraph, wherein: the plate-biasing mechanism (116) includes: a manifold-spring assembly (130); and a plate-mounting assembly (132) configured to operatively mount the manifold-spring assembly (130) so as to bias the manifold plate (110) toward the backing plate (112). Clause (14): the mold-tool system (100) of any clause mentioned in this paragraph, wherein: the plate-moving mechanism (114) includes: a cam-jack assembly (120); and a manifold-mounting assembly (122) configured to: (i) operatively rotatably mount the cam-jack assembly (120) relative to the manifold plate (110) and the backing plate (112), and (ii) permit rotation of the cam-jack assembly (120), the cam-jack assembly (120) selectively moving the manifold plate (110) and the backing plate (112) relative to each other; and the plate-biasing mechanism (116) includes: a manifold-spring assembly (130); and a plate-mounting assembly (132) configured to operatively mount the manifold-spring assembly (130) so as to bias the manifold plate (110) toward the backing plate (112). Clause (15): a molding system (900) having the mold-tool system (100) of any clause mentioned in this paragraph. Clause (16): a runner assembly (916) having the mold-tool system (100) of any clause mentioned in this paragraph. Clause (17): a nozzle assembly (102), comprising: a nozzle position-adjustment assembly (104) being configured to selectively adjust position of the nozzle assembly (102) between: (i) a first nozzle position, and (ii) a second nozzle position.

The FIGS depict examples of the mold-tool system (100). It will be appreciated that the examples depicted in the FIGS. may be combined in any suitable permutation and combination. It will be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the inventions and/or examples of the invention that is superior to others, so long as the functions may be performed. It is believed that all the crucial aspects of the invention have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:
1. A mold-tool system (100), comprising:
a backing plate;
a manifold plate facing the backing plate;
a nozzle assembly, the manifold plate supporting a positioning of the nozzle assembly; and
a nozzle position-adjustment assembly (104), the nozzle position-adjustment assembly comprising:
a plate-biasing mechanism constructed and arranged to bias a position of the manifold plate and the backing plate together; and
a plate-moving mechanism constructed and arranged to selectively adjust a position of the manifold plate and the backing plate relative to each other between:
(i) a nozzle-loaded position, and
(ii) a nozzle-unloaded position.
2. The mold-tool system (100) of claim 1, wherein:
in the nozzle-loaded position, the nozzle assembly (102) is positioned in a fixed position, and
in the nozzle-unloaded position, the nozzle assembly (102) is removable from the fixed position.
3. The mold-tool system (100) of claim 2, wherein:
in the nozzle-loaded position, the nozzle assembly (102) is non-rotatable, and
in the nozzle-unloaded position, the nozzle assembly (102) is rotatable.
4. The mold-tool system (100) of claim 2, wherein:
the nozzle assembly (102) is spring biased toward the nozzle-loaded position; and
the nozzle position-adjustment assembly (104) is configured to selectively adjust spring biasing of the nozzle assembly (102), so that the nozzle assembly (102) is selectively adjustably positionable between:
(i) the nozzle-loaded position, and
(ii) the nozzle-unloaded position.

5. The mold-tool system (100) of claim 1, wherein:
for the case where the plate-moving mechanism (114) is actuated, the plate-moving mechanism (114) is configured to overcome, in use, the plate-biasing mechanism (116) so that the manifold plate (110) and the backing plate (112) are moved away from each other, and the nozzle assembly (102) is selectively moved from the nozzle-loaded position to the nozzle-unloaded position; and
for the case where the plate-moving mechanism (114) is not actuated, the plate-biasing mechanism (116) biases, in use, the backing plate (112) against the manifold plate (110).

6. The mold-tool system (100) of claim 1, wherein:
the plate-moving mechanism (114) includes:
   a cam-jack assembly (120); and a manifold-mounting assembly (122) configured to:
      (i) operatively rotatably mount the cam-jack assembly (120) relative to the manifold plate (110) and the backing plate (112), and
      (ii) permit rotation of the cam-jack assembly (120), the cam-jack assembly (120) selectively moving the manifold plate (110) and the backing plate (112) relative to each other.

7. The mold-tool system (100) of claim 1, wherein:
the plate-biasing mechanism (116) includes:
   a manifold-spring assembly (130); and
   a plate-mounting assembly (132) configured to operatively mount the manifold-spring assembly (130) so as to bias the manifold plate (110) toward the backing plate (112).

8. The mold-tool system (100) of claim 1, wherein:
the plate-moving mechanism (114) includes:
   a cam-jack assembly (120); and
   a manifold-mounting assembly (122) configured to:
      (i) operatively rotatably mount the cam-jack assembly (120) relative to the manifold plate (110) and the backing plate (112), and
      (ii) permit rotation of the cam-jack assembly (120), the cam-jack assembly (120) selectively moving the manifold plate (110) and the backing plate (112) relative to each other; and
the plate-biasing mechanism (116) includes:
   a manifold-spring assembly (130); and
   a plate-mounting assembly (132) configured to operatively mount the manifold-spring assembly (130) so as to bias the manifold plate (110) toward the backing plate (112).

9. A molding system (900) having the mold-tool system (100) of claim 1.

10. A runner assembly (916) having the mold-tool system (100) of claim 1.

11. A nozzle assembly (102), comprising:
a nozzle position-adjustment assembly (104), the nozzle position-adjustment comprising:
   a plate-biasing mechanism constructed and arranged to bias, in use, a position of a manifold plate and a backing plate together, the manifold plate adapted to support a positioning of the nozzle assembly, the backing plate adapted to face the manifold plate; and
   a plate-moving mechanism constructed and arranged to selectively adjust a position of the manifold plate and the backing plate relative to each other between:
      (i) a nozzle-loaded position, and
      (ii) a nozzle-unloaded position.

12. A nozzle position-adjustment assembly, comprising:
a plate-biasing mechanism constructed and arranged to bias, in use, a position of a manifold plate and a backing plate together, the manifold plate adapted to support a positioning of the nozzle assembly, the backing plate adapted to face the manifold plate; and
a plate-moving mechanism constructed and arranged to selectively adjust, in use, a position of the manifold plate and the backing plate relative to each other between:
   (i) a nozzle-loaded position, and
   (ii) a nozzle-unloaded position.

* * * * *